United States Patent
Kolouri et al.

(10) Patent No.: US 10,607,111 B2
(45) Date of Patent: Mar. 31, 2020

(54) MACHINE VISION SYSTEM FOR RECOGNIZING NOVEL OBJECTS

(71) Applicant: HRL Laboratories, LLC, Malibu, CA (US)

(72) Inventors: Soheil Kolouri, Agoura Hills, CA (US); Charles E. Martin, Santa Monica, CA (US); Kyungnam Kim, Oak Park, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/267,033

(22) Filed: Feb. 4, 2019

(65) Prior Publication Data

US 2019/0244059 A1    Aug. 8, 2019

Related U.S. Application Data

(60) Provisional application No. 62/627,150, filed on Feb. 6, 2018.

(51) Int. Cl.
*G06K 9/00* (2006.01)
*G06K 9/62* (2006.01)
(Continued)

(52) U.S. Cl.
CPC ....... *G06K 9/6223* (2013.01); *G06K 9/00664* (2013.01); *G06K 9/4628* (2013.01);
(Continued)

(58) Field of Classification Search
CPC .. G06K 9/6223; G06K 9/4628; G06K 9/6254; G06K 9/00664; G06K 9/4671;
(Continued)

(56) References Cited

U.S. PATENT DOCUMENTS 9,633,483 B1 * 4/2017 Xu .......................... G06T 17/10
2007/0005356 A1 * 1/2007 Perronnin ............ G06K 9/4676
704/245

(Continued)

FOREIGN PATENT DOCUMENTS

JP         5247480 B2      7/2013

OTHER PUBLICATIONS

Russakovsky, Olga, and Li Fei-Fei. "Attribute learning in large-scale datasets." In European Conference on Computer Vision, pp. 1-14. Springer Berlin Heidelberg, 2010.

(Continued)

*Primary Examiner* — Van D Huynh
(74) *Attorney, Agent, or Firm* — Tope-McKay & Associates

(57) ABSTRACT

Described is a system for classifying novel objects in imagery. In operation, the system extracts salient patches from a plurality of unannotated images using a multi-layer network. Activations of the multi-layer network are clustered into key attribute, with the key attributes being displayed to a user on a display, thereby prompting the user to annotate the key attributes with class label. An attribute database is then generated based on user prompted annotations of the key attributes. A test image can then be passed through the system, allowing the system to classify at least one object in the test image by identifying an object class in the attribute database. Finally, a device can be caused to operate or maneuver based on the classification of the at least one object in the test image.

15 Claims, 6 Drawing Sheets

(51) Int. Cl.
G06K 9/46 (2006.01)
G06T 7/40 (2017.01)
G06T 1/00 (2006.01)
G06N 3/04 (2006.01)

(52) U.S. Cl.
CPC ......... G06K 9/4671 (2013.01); G06K 9/6254 (2013.01); G06N 3/0454 (2013.01); G06T 1/0014 (2013.01); G06T 7/40 (2013.01); G06K 9/4676 (2013.01); G06K 9/6239 (2013.01)

(58) Field of Classification Search
CPC .. G06K 9/6239; G06K 9/4676; G06N 3/0454; G06T 1/0014; G06T 7/40
USPC ........................................................ 382/224
See application file for complete search history.

(56) References Cited

U.S. PATENT DOCUMENTS

| | | | | |
|---|---|---|---|---|
| 2007/0258648 | A1* | 11/2007 | Perronnin | G06K 9/00281 382/224 |
| 2009/0297050 | A1 | 12/2009 | Li et al. | |
| 2010/0040285 | A1* | 2/2010 | Csurka | G06K 9/00624 382/170 |
| 2010/0226564 | A1* | 9/2010 | Marchesotti | G06K 9/4671 382/159 |
| 2014/0270350 | A1* | 9/2014 | Rodriguez-Serrano | G06K 9/6217 382/103 |
| 2014/0270495 | A1* | 9/2014 | Tu | G06K 9/6259 382/160 |

OTHER PUBLICATIONS

Simonyan, Karen, and Andrew Zisserman. "Very deep convolutional networks for large-scale image recognition." arXiv preprint arXiv:1409.1556 (2014), pp. 1-14.

Xie, Junyuan, Ross Girshick, and Ali Farhadi. "Unsupervised Deep Embedding for Clustering Analysis." arXiv preprint arXiv:1511.06335 (2015), pp. 1-10.

Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.

Romera-Paredes, Bernardino, and P. H. S. Torr. "An embarrassingly simple approach to zero-shot learning." In Proceedings of The 32nd International Conference on Machine Learning, pp. 2152-2161. 2015.

Farhadi, Ali, Ian Endres, Derek Hoiem, and David Forsyth. "Describing objects by their attributes." In Computer Vision and Pattern Recognition, 2009. CVPR 2009. IEEE Conference on, pp. 1778-1785. IEEE, 2009.

Lindeberg, Tony. Scale-space theory in computer vision. vol. 256., Chapter 14: Direct Computation of Multi-Scale Shape Cues, Springer Science & Business Media, 2013, pp. 349-382.

Sotiras, Aristeidis, Susan M. Resnick, and Christos Davatzikos. "Finding imaging patterns of structural covariance via non-negative matrix factorization." NeuroImage 108 (2015): pp. 1-16.

Tan, Pang-Ning, Michael Steinbach, Anuj Karpatne, and Vipin Kumar, Introduction to Data Mining, 2nd Ed., Chapter 7: Cluster Analysis: Basic Concepts and Algorithms, Pearson, 2019.

Ref: Görür, D. and Rasmussen, C.E., 2010. Dirichlet process gaussian mixture models: Choice of the base distribution. Journal of Computer Science and Technology, 25(4), pp. 653-664.

Notification of Transmittal of International Search Report and the Written Opinion of the International Searching Authority for PCT/US2019/016550; dated May 24, 2019.

International Search Report of the International Searching Authority for PCT/US2019/016550; dated May 24, 2019.

Written Opinion of the International Searching Authority for PCT/US2019/016550; dated May 24, 2019.

Guanbin Li et al., 'Visual Saliency Detection Based on Multiscale Deep CNN Features', IEEE Transactions on Image Processing, Sep. 7, 2016.

Yao Lu, 'Unsupervised Learning for Image Classification', University of Helsinki Department of Computer Science, Dec. 8, 2015.

\* cited by examiner

MACHINE VISION SYSTEM FOR RECOGNIZING NOVEL OBJECTS

CROSS-REFERENCE TO RELATED APPLICATIONS

This application claims the benefit of and is a non-provisional patent application of U.S. 62/627,150, filed on Feb. 6, 2018, the entirety of which is hereby incorporated by reference.

BACKGROUND OF INVENTION

(1) Field of Invention

The present invention relates to an object recognition system and, more specifically, to a machine vision system for recognizing novel objects.

(2) Description of Related Art

Object recognition systems are often used to identify objects in a scene or setting based on a variety of object features. Recently, there has been a large body of work on describing objects based on their parts or attributes. Farhadi et al., for instance, used object attributes (e.g. 'has head', 'hairy', and 'four legged') to describe objects and used these attributes to learn new classes of objects only based on a few annotated data (see the List of Incorporated Literature References, Literature Reference No. 6). Another relevant method is that of Russakovsky et al. (see Literature Reference No. 1). The authors in Russakovsky et al. use Amazon Mechanical Turk (AMT) to annotate the presence or absence of predefined attributes in large number of images. Next, they learn binary classifiers for the attributes in a supervised manner, and use them to perform zero-shot transfer. Various zero-shot learning (ZSL) techniques also use attributes annotated or designed by humans, for instance the work of Romera-Paredes et al. (see Literature Reference No. 5) or the work of Akata et al. (see Literature Reference No. 4). These attribute learning methods, however, require large numbers of annotated images together with many predefined attributes (which might not be relevant to the recognition task at hand).

Thus, a continuing need exists for a system that utilizes a pre-trained object-detection network to obtain a small set of unannotated key attributes from the data, with an operator only annotating the small set of key attributes, which are then used to identify novel classes of objects.

SUMMARY OF INVENTION

This disclosure provides a system for classifying novel objects in imagery. In various aspects, the system includes one or more processors and a memory. The memory is a non-transitory computer-readable medium having executable instructions encoded thereon, such that upon execution of the instructions, the one or more processors perform several operations, including extracting salient patches from a plurality of unannotated images using a multi-layer network; clustering activations of the multi-layer network into key attributes; and displaying the key attributes to a user on a display and prompting the user to annotate the key attributes with class label; and generating an attribute database based on user generated annotations of the key attributes.

In another aspect, the system further performs operations of extracting salient patches from a test image, the test image having at least one object associated with the salient patches; mapping the salient patches onto a binary attribute vector, the binary attribute vector indicating an existence or absence of key attributes in the test image; and classifying at least one object in the test image by identifying an object class in the attribute database corresponding to the binary attribute vector. Further, the system performs an operation of controlling a device based on the classification of the at least one object in the test image.

In yet another aspect, the at least one object is classified based on an optimization routine that minimizes a distance between the binary attribute vector of attributes (e.g., textual or visual) of a class and the binary attribute vector of the key attributes of the test image. Examples of visual attributes are image parts/segments/patches clustered into K centroids.

In another aspect, controlling the device includes causing the device to maneuver based on the classification of the at least one object in the test image.

In another aspect, the attribute database includes a library of object classes and corresponding textual attributes describing each object.

Further, the salient patches are extracted from an intensity image.

In another aspect, the multi-layer network is a neural network and salient patches are extracted based on the neural network's activation for each image pixel or group of pixels in an image.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
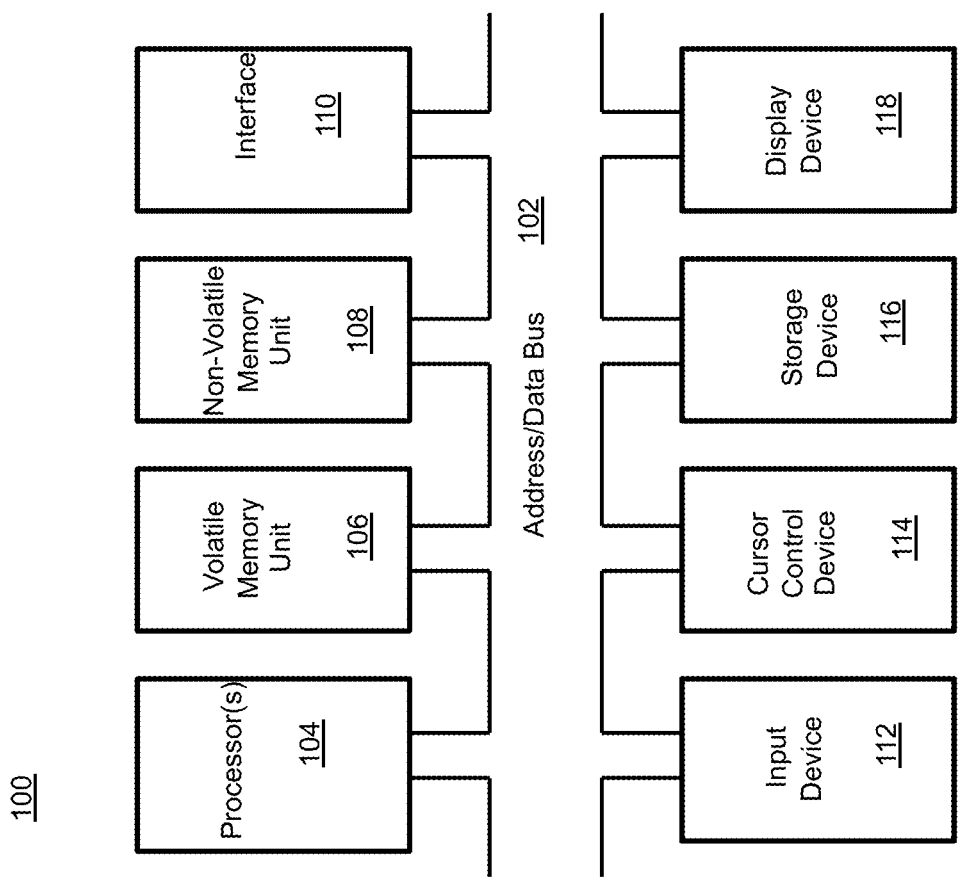
FIG. 1 is a block diagram depicting the components of a system according to various embodiments of the present invention.

The present invention relates to an object recognition system and, more specifically, to a machine vision system for recognizing novel objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:
1. Russakovsky, Olga, and Li Fei-Fei. "Attribute learning in large-scale datasets." In European Conference on Computer Vision, pp. 1-14. Springer Berlin Heidelberg, 2010.
2. Simonyan, Karen, and Andrew Zisserman. "Very deep convolutional networks for large-scale image recognition," arXiv preprint arXiv:1409.1556 (2014).
3. Xie. Junyuan, Ross Girshick, and Ali Farhadi, "Unsupervised Deep Embedding for Clustering Analysis." arXiv preprint arXiv:1511.06335 (2015).
4. Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.
5. Romera-Paredes, Bernardino, and P. H. S. Torr. "An embarrassingly simple approach to zero-shot learning." In Proceedings of The 32nd International Conference on Machine Learning, pp. 2152-2161. 2015.
6. Farhadi, Ali, Ian Endres, Derek Hoiem, and. David Forsyth. "Describing objects by their attributes," In Computer Vision and Pattern Recognition, 2009. CVPR 2009. IEEE Conference on, pp. 1778-1785. IEEE, 2009.
7. Lindeberg, Tony. Scale-space theory in computer vision. Vol. 256., Chapter 14: Direct Computation of Multi-Scale Shape Cues, Springer Science & Business Media, 2013.
8. Sotiras, Aristeidis, Susan M. Resnick, and Christos Davatzikos. "Finding imaging patterns of structural covariance via non-negative matrix factorization," NeurolImage 108 (2015): 1-16.
9. Tan, Pang-Ning, Michael Steinbach, Anuj Karpatne, and Vipin Kumar, Introduction to Data Mining, $2^{nd}$ Ed., Chapter 7: Cluster Analysis: Basic Concepts and Algorithms, Pearson, 2019.
10. Ref: Görür, D. and Rasmussen, C. E., 2010, Dirichlet process gaussian mixture models: Choice of the base distribution. *Journal of Computer Science and Technology*, 25(4), pp. 653-664.

(2) Principal Aspects

Various embodiments of the invention include three "principal" aspects. The first is a system for object recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
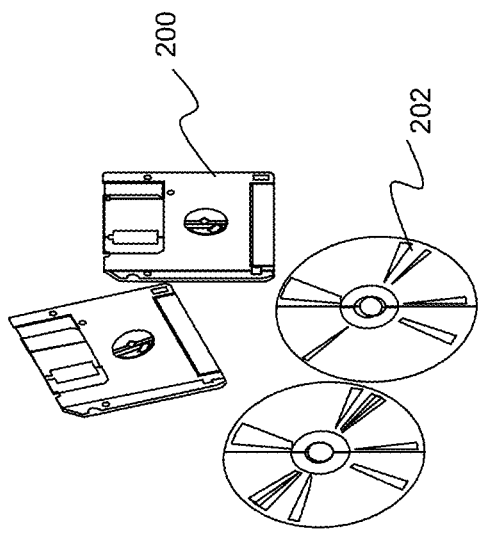
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Modern vision systems require a large number of annotated images for training. Unfortunately, annotated data is often expensive to acquire. In addition, annotated data is simply not available for certain applications. The present disclosure addresses this issue by providing a semi-supervised machine-vision system that requires few annotations from a human user, and is able to classify vast number of object classes based on these few input annotations.

The system described in the present disclosure implements a machine learning method based on object parts that allows recognition of previously unseen objects (i.e., objects that were not in the image training data set). The system starts by processing a large number of unannotated images and extracting salient image patches using a pre-trained (on annotated and seen images) convolutional neural network (CNN). The system then probes the network and extracts its hierarchical responses for the extracted patches. The extracted patches are then clustered into K key visual attributes in an unsupervised manner. The number of clusters 'K' could be given as an input to the clustering method as in K-means (see Literature Reference No. 9), or could be found by the clustering method itself, as in Drichlet Process Gaussian Mixture Models (see Literature Reference No. 10). Next, an operator is prompted to provide labels for the K extracted key visual attributes (i.e., labels are textual attributes provided by the user). For instance, a key visual attribute may be a patch containing a wheel, in which case the user assigns the textual label 'wheel' to these key visual attributes. In this manner, the process is semi-supervised as it asks the operator to annotate the extracted key visual attributes with textual attributes. The system then summarizes an input image into a binary vector of length K that denotes the existence/absence of the annotated key attributes. Finally, the process is used in a Zero-Shot Learning (ZSL) setting to label the unannotated input images based on their extracted binary attribute features and semantic auxiliary information obtained from other sources of information. By using, for example, a word description from the set of labels of key attributes, the system is able to identify previously unseen object classes so as long as a word description of the novel class is available. In the case that the system does not contain an appropriate textual attribute for the extracted visual attributes, it can prompt the user to provide textual attributes for the unknown visual attributes and continually learn new object parts and attributes.

An advantage of the system described herein is that it extracts key attributes from a large number of unannotated images in an unsupervised manner and reduces the complexity of data annotation from the number of images, N, to the number of key attributes, K, where K is orders of magnitude smaller than N. Moreover, this system is able to identify object classes that were not part of the image training data set, as long as other auxiliary information about these classes is available (e.g. textual information, semantic attribute parsing, etc.).

As can be appreciate by those skilled in the art, the present disclosure addresses the need for a machine vision system (in, for example, autonomous driving applications) that is capable of identifying a large number of classes while requiring few annotations. Current machine vision systems require a large number of annotated training data that covers a wide range of classes. Obtaining annotated data for all visual classes is practically impossible and hence there is a dire need for learning systems that can transfer and adapt their learned knowledge to reason about novel classes. Thus, the system described herein addresses this issue by providing a machine vision system for autonomy and for intelligence, surveillance, and reconnaissance (ISR), and other applications. Specific details are provided below.

(4) Specific Details of Various Embodiments

As noted above, the present disclosure provides a machine vision system that can recognize novel objects or scenes in camera images or other imagery without requiring large numbers of annotated images or image parts for training. The camera may be optical, infrared (IR), short wave IR, or similar, such that the output is an intensity image with one or more channels. Current machine vision systems often require very large number of annotated images for training. This requirement is indeed a shortcoming of such methods specifically in situations where obtaining annotated data is expensive or infeasible.

Figure 3:
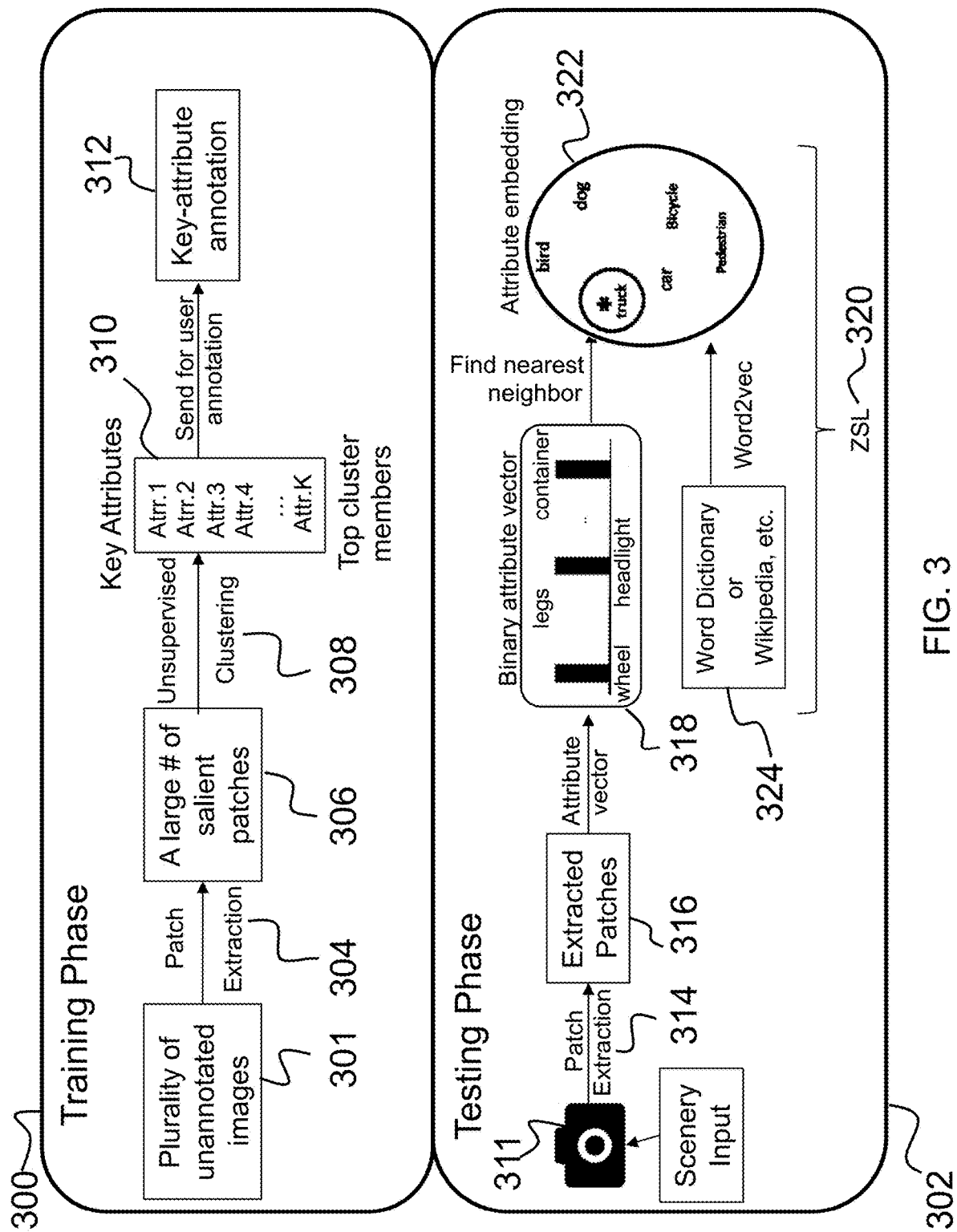
FIG. 3 is a flow chart illustrating information flow of a system according to various embodiments of the present invention.

As shown in FIG. 3, the machine vision system includes a training phase 300 and a testing phase 302. In the training phase 300, a pre-trained convolutional neural network is used (on seen and labeled images) on images 301 for patch extraction 304. The system performs patch extraction 304 by probing the multilayer neural activations of this network for a large number (e.g., millions, etc.) of salient image patches 306. Unsupervised clustering 308 is performed on the salient image patches 306 in which these neural activations are clustered to provide K representative image parts or key-attributes 310. Each attribute in 310 is a visual cluster. To make it easier for the user to annotate these clusters with textual attribute, the top members (e.g., top 5, or any other predetermined amount) of each cluster are shown to the operator. These top members (e.g., top 5, etc.) are shown for example in the grouping depicted as element 502 in FIG. 5. The K key-attributes 310 are then annotated 312 by a human operator. For example, the attributes are displayed on a visual display in which the operator can input annotations for each of the attributes. Note that K is orders of magnitude smaller than the number of training images. In contrast, the prior art methods require per image annotations.

In the testing phase 302 (e.g., real world operations), for a new un-annotated input image from a camera 311, a patch extraction process 314 is similarly performed to generate extracted patches 316. From the extracted patches 316 a binary attribute vector 318 is constructed, which indicates the existence or absence of key-features. Finally, this binary attribute vector 318 is used in a zero-shot learning (ZSL) setting 320 to perform attribute embedding 322 with information from an existing attribute database 324 and annotate the input image with a label classification. Further details regarding the training phase 300 and testing phase 302 are provided below.

(4.1) Training Phase

Given a large set of unannotated images 301, the system performs patch extraction 304 as follows. First, the system identifies the salient regions of the images 301. To achieve this, the system utilizes a pre-trained CNN, and for a given input image, it applies elastic Nonnegative Matrix Factorization (NMF) (see Literature Reference No. 8) to the activation patterns (i.e., last convolutional layer) of the CNN to obtain and extract principal activation patterns for the input data. A non-limiting example of such a pre-trained CNN can be found in Literature Reference No. 2.

Note that since the system does not use the fully connected layers of the CNN at this stage, the size of the input image could vary. More precisely, let $X=x_k k=1$ m∈Rd×m denote the vectorized CNN responses of the last convolutional layer (e.g. the 'conv5_4' of VGG19 (see Literature Reference No. 2)), where m is the number of convolutional kernels at the last layer (e.g., m=512 in VGG19), and d is the number of nodes per convolutional kernel and scales with the size of the input image. Then, the NMF is formulated as, $$\arg\min_{W,H} [\tfrac{1}{2}\|X-HW\|_F^2 + \gamma\|XW\|_1 + \|H\|_1 + \tfrac{1}{2}\gamma_1 - \lambda\|W\|_F^2 + \|H\|_F^2]$$

where .F is the Frobenius norm, 0.1 is the elementwise L1 norm, columns of H∈Rd×r are the non-negative components, W∈Rr×m is the non-negative coefficient matrix, r is the rank of matrix H, which corresponds to the number of extracted components, and λ and γ are regularization parameters. A coordinate descent solver is used to find H and W.

After extracting the non-negative components, columns of H, and up-sampling (i.e., resizing to the original image size to counter the down-sampling of the pooling layers), each component is processed using a Laplacian-of-Gaussian blob-detector to extract regions of the input image that are considered salient by the CNN. A non-limiting example of a suitable Laplacian-of-Gaussian blob-detector can be found in Literature Reference No. 7. The regions of the image that are extracted by the blob detector are designated as the extracted salient patches 306.

Next, the system extracts the activation patterns of the CNN at different layers and constructs a multi-scale feature for the extracted patches. This is done by performing general average pooling (GAP) at each layer of the network right before the 'max pooling' together with normalizing and concatenating the outputs. The proposed feature captures the response energy of various convolutional kernels at different layers, and provides a succinct representation of the CNN. The extracted salient patches, which are parts of the input image, are at different sizes (see element 306 of FIG. 4 for instance). For example, the extracted patches 306 as depicted in FIG. 3 could have different sizes, with actual example patches illustrated as element 306 in FIG. 4 (i.e., the wheel is a much larger patch compared to the heads). Furthermore, the extracted patches are still in the image domain and computational analysis of these patches is still difficult. To avoid this problem, the system uses the neural activations (i.e., the activation patterns of the CNN) and forms a fixed-size feature vector for different patches (regardless of their size differences). These features are then clustered to form the key attributes (shown as element 310).

Figure 4:
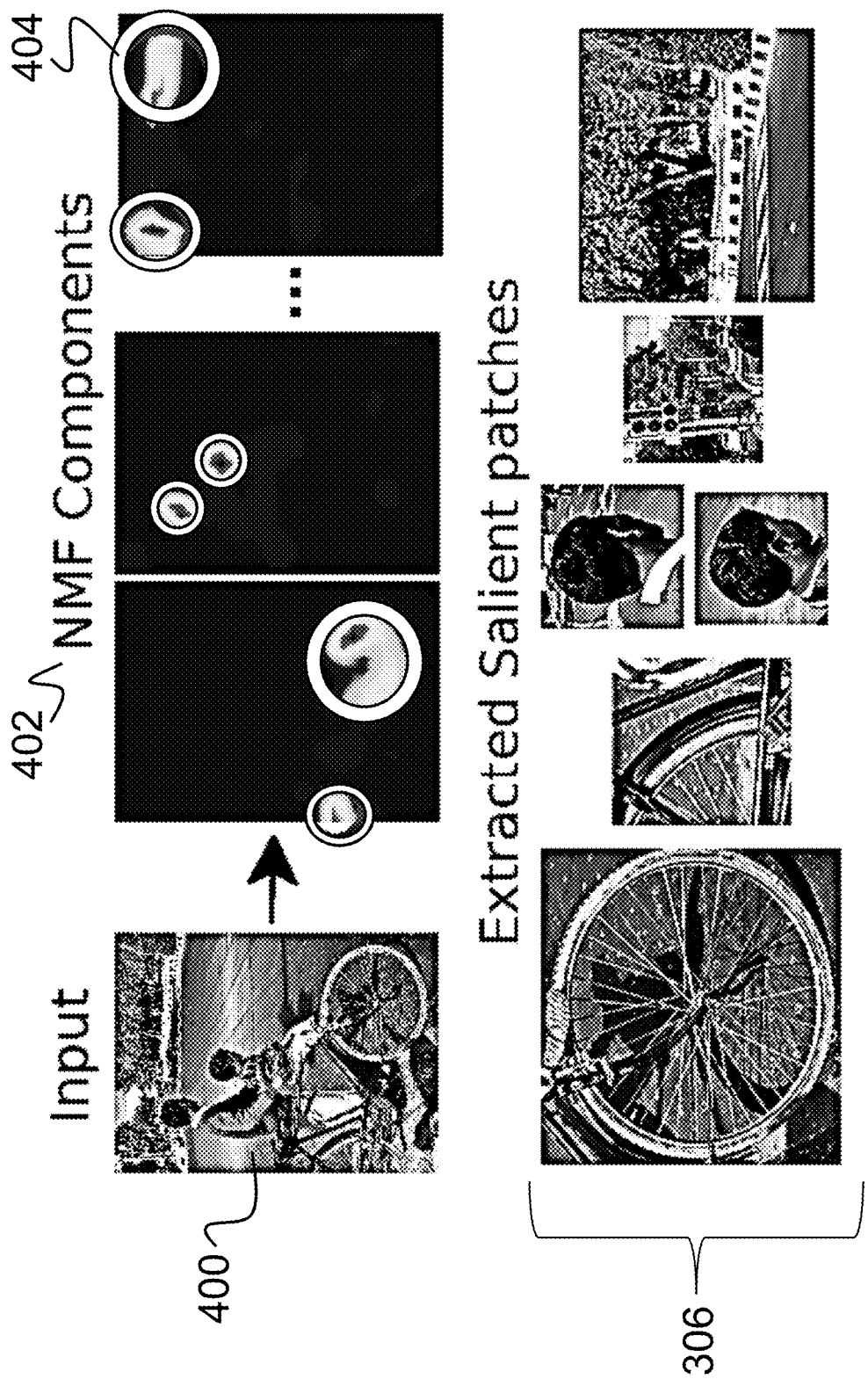
FIG. 4 is a flow chart illustrating an example process of generating salient patches from an input image according to embodiments of the present invention.

An illustrative example of the process described above is summarized in FIG. 4. Specifically, FIG. 4 shows an example input image 400 to the CNN, the NMF components 402 applied to the last convolutional layer, the detected blobs (circles 404), and the corresponding salient patches 306. It can be seen that the NMF applied to the neural activation patterns of a CNN leads to semantically meaningful object attributes.

Having the salient patches 306 from all images in the dataset and their corresponding GAP+CNN features, the system utilizes an unsupervised learning framework (i.e., unsupervised clustering 308) to identify the key attributes 310 recognized by the network. For example, the system can employ an unsupervised deep embedding for clustering (DEC) process (see Literature Reference No. 3) to cluster the salient extracted patches 306. The idea behind DEC is to transform the data into a linear or nonlinear embedding space with a richer data representation and to cluster the data in that space. The embedding and clusters are then learned simultaneously in an iterative fashion. The extracted clusters are referred to as the key attributes 310.

Figure 5:
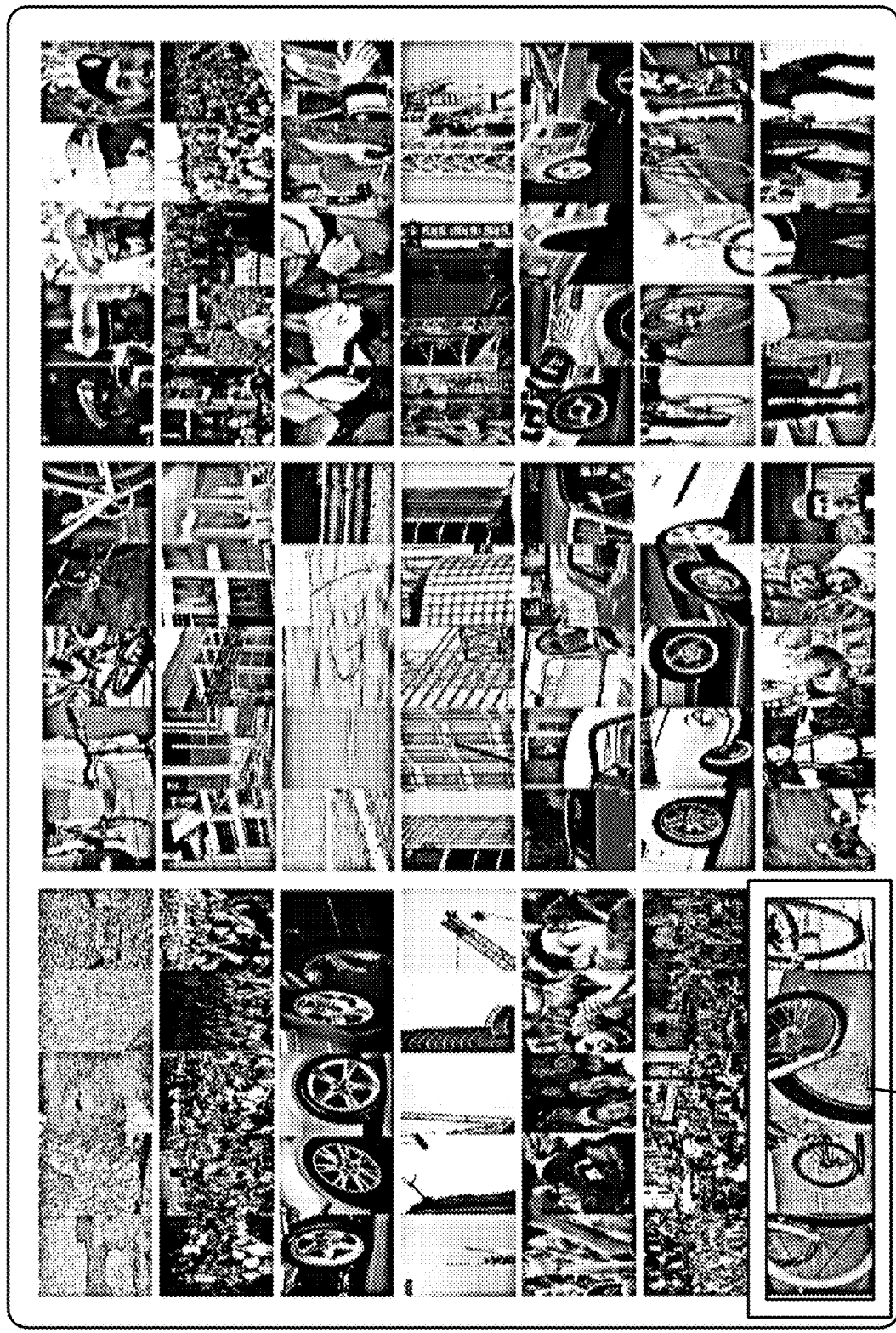
FIG. 5 is an illustration depicting examples of sample clusters which are shown to an operator for annotation according to embodiments of the present invention.

In the final stage of the training phase 300, an operator is prompted to annotate the extracted key attributes 310. As a non-limiting example, a computer display shows the top five members of each attribute cluster, and the computer system prompts the operator to annotate the clusters with an appropriate label. Alternatively, multiple operators may be used, and the annotations from all operators are collected and analyzed to come up with reliable annotations for the key attributes (e.g., using majority vote, etc.). FIG. 5, for example, is an example computer display 500 that depicts the top five image patches for a sample of extracted key attributes or clusters 502. Thus, the top five members of each cluster (total K clusters) will be shown to the user sequentially and the user is required to provide textual attributes for them. Here, K is decided by the clustering algorithm.

In other words, the display provides a plurality of clusters 502, where each cluster 502 depicts the top five image patches having the key attributes. For each cluster 502, the operator would choose a key-attribute from a given set of predefined attributes (e.g. "wheel", "hand", . . . , and "not clear"). At the end of the annotation period, each cluster corresponds to a certain attribute index, with respect to the predefined attributes.

Finally, at the end of the training phase 300, the system is operable for receiving an image and parsing its salient parts (as perceived by a pre-trained neural network) into a binary attribute vector that identifies existence of the corresponding key-attributes. For instance, an image of a car would have binary value one on the indices corresponding to "wheel", "head light", etc. Having trained such a system, the system is now able to operate in the testing phase 302 to categorize different classes of unseen images so long as it can be described as a combination of the extracted key-attributes.

(4.2) Testing Phase

In the testing phase 302 and as shown in FIG. 3, given an input image from a camera 311 and similar to the training phase, the system first extracts its salient patches 316, forms a fixed-size feature vector from the convolutional neural activations for each salient patch, and assigns the fixed size vector to a cluster centroid, which is a key attribute. This process parses the image into salient patches and from salient patches to a binary vector that indicates existence of annotated key attributes 312 in the extracted salient patches (see binary attribute vector 318). The assignment to key attributes uses the same clustering as during training without recomputing the embedding.

The binary attribute vector 318 indicates the existence or absence of the annotated attributes in the image. Let this K-dimensional binary vector for the input image, I, be denoted as, $fI \in 0,1$ K, and let the key attributes extracted from a word dictionary or Wikipedia for seen and unseen classes be denoted as $\alpha i$. Then the test or new input image, I, is annotated through an attribute embedding process 322 by finding its nearest neighbor $\alpha i$:

$$\text{argmin}_i \, d(fI, \alpha i),$$

where $d(.,.)$ could be chosen as the Hamming distance or the Euclidean distance between the K-dimensional binary vectors. The label associated with the nearest neighbor is then designated as a label for the input image with the input image then classified using the designated label. Thus, an object in the input image is classified for further processing or use by other systems or processes.

The system classifies novel classes of images from the extracted key attributes using the zero-shot learning approach, which obtains a representation of the novel classes with respect to the annotated key attributes. To achieve such representations of novel classes of images, the system can employ the textual description of these classes. For instance, in the training the system may have seen lots of images of cars and bicycles, but may have never seen images of unicycles. Thus, the textual descriptions help to define the classes.

A word dictionary provides a list of words and corresponding attributes. This list could be generated, for example, by parsing Wikipedia. As an example, Wikipedia describes a unicycle as consisting of a wheel, hub, pedals, fork-style frame, seat post, and saddle. In this manner, the system obtains a key-attributes representation 312 for the novel class, 'unicycle', that represents this novel class in the attribute embedding, 322. When an image of a unicycle is received in testing time, its extracted key attributes are compared against the attribute representations of different classes in the embedding space 322. Zero-shot learning 322 is used to match the image key attributes with the textual attributes. The closest match provides the image classification.

(4.5) Control of a Device

Figure 6:
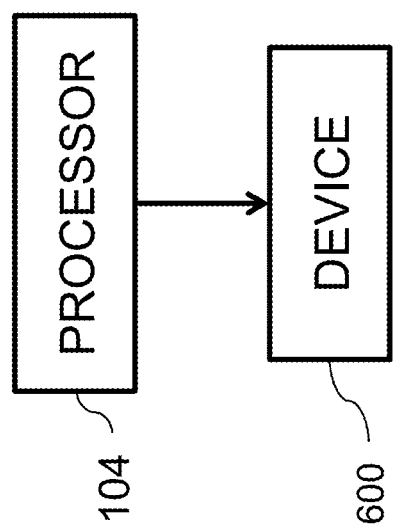
FIG. 6 is an illustration depicting a device being controlled according to various embodiments of the present invention.

As shown in FIG. 6, a processor 104 may be used to control a device 600 (e.g., a mobile device display, a virtual reality display, an augmented reality display, a computer monitor, a motor, a machine, a drone, a camera, etc.) based on classifying an object in the image. The control of the device 600 may be used to transform the classification of the object into a localization of the object on the image or location within the scene from which the input image was captured. In other embodiments, the device 600 may be controlled to cause the device 600 to move or otherwise initiate a physical action based on the classification and/or localization.

In some embodiments, a drone or other autonomous vehicle may be controlled to move to an area where the localization of the object is determined to be based on the imagery. In yet some other embodiments, a camera may be controlled to orient towards the localization. In other words, actuators or motors are activated to cause the camera (or sensor) to move or zoom in on the location where the object is localized. In yet another aspect, if a system is seeking a particular object and if the object is not determined to be within the field-of-view of the camera after the discrimination process, the camera can be caused to rotate or turn to view other areas within a scene until the sought-after object is detected.

In addition, in some other embodiments, an autonomous vehicle is the device 600. For example, if the object is classified as a stop sign, the system may cause the autonomous vehicle to apply a functional response, such as a braking operation, to stop the vehicle (thereby performing a physical operation). Other appropriate responses may include one or more of a steering operation, a throttle operation to increase speed or to decrease speed, or a decision to maintain course and speed without change. The responses may be appropriate for avoiding a collision, improving travel speed, or improving efficiency. Other examples include causing the vehicle to drive to maintain within road lines, or steer to avoid a collision with a pedestrian or other object as may be classified within the input image. In yet another example, the system can trigger an audible alarm when recognizing a certain group of objects. In this example, the alarm is the device 600 being controlled and caused to emit an audible sound. Thus, as can be appreciated by one skilled in the art, there are a number of devices 600 that can be caused to maneuver or otherwise operate based on a particular application and object classification.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for classifying novel objects in imagery, the system comprising:
one or more processors and a memory, the memory being a non-transitory computer-readable medium having executable instructions encoded thereon, such that upon execution of the instructions, the one or more processors perform operations of:
extracting salient patches from a plurality of unannotated images using a multi-layer network;
clustering activations of the multi-layer network into key attributes; and
displaying the key attributes to a user on a display and prompting the user to annotate the key attributes with class label;
generating an attribute database based on user generated annotations of the key attributes;
extracting salient patches from a test image, the test image having at least one object associated with the salient patches;
mapping the salient patches onto a binary attribute vector, the binary attribute vector indicating an existence or absence of key attributes in the test image;
classifying at least one object in the test image by identifying an object class in the attribute database corresponding to the binary attribute vector; and
controlling a device based on the classification of the at least one object in the test image.

2. The system as set forth in claim 1, wherein the at least one object is classified based on an optimization routine that minimizes a distance between the binary attribute vector of textual attributes of a class and the binary attribute vector of the key attributes of the test image.

3. The system as set forth in claim 1, wherein controlling the device includes causing the device to maneuver based on the classification of the at least one object in the test image.

4. The system as set forth in claim 1, wherein the attribute database includes a library of object classes and corresponding textual attributes describing each object.

5. The system as set forth in claim 1, wherein the multi-layer network is a neural network and salient patches are extracted based on the neural network's activation for each image pixel or group of pixels in an image.

6. A computer program product for classifying novel objects in imagery, the computer program product comprising:
a non-transitory computer-readable medium having executable instructions encoded thereon, such that upon execution of the instructions by one or more processors, the one or more processors perform operations of:
extracting salient patches from a plurality of unannotated images using a multi-layer network;
clustering activations of the multi-layer network into key attributes; and
displaying the key attributes to a user on a display and prompting the user to annotate the key attributes with class label;
generating an attribute database based on user generated annotations of the key attributes;
extracting salient patches from a test image, the test image having at least one object associated with the salient patches;
mapping the salient patches onto a binary attribute vector, the binary attribute vector indicating an existence or absence of key attributes in the test image;

classifying at least one object in the test image by identifying an object class in the attribute database corresponding to the binary attribute vector; and controlling a device based on the classification of the at least one object in the test image.

7. The computer program product as set forth in claim 6, wherein the at least one object is classified based on an optimization routine that minimizes a distance between the binary attribute vector of textual attributes of a class and the binary attribute vector of the key attributes of the test image.

8. The computer program product as set forth in claim 6, wherein controlling the device includes causing the device to maneuver based on the classification of the at least one object in the test image.

9. The computer program product as set forth in claim 6, wherein the attribute database includes a library of object classes and corresponding textual attributes describing each object.

10. The computer program product as set forth in claim 6, wherein the multi-layer network is a neural network and salient patches are extracted based on the neural network's activation for each image pixel or group of pixels in an image.

11. A computer implemented method for classifying novel objects in imagery, the method comprising an act of:

causing one or more processors to execute instructions encoded on a non-transitory computer-readable medium, such that upon execution, the one or more processors perform operations of:

extracting salient patches from a plurality of unannotated images using a multi-layer network;

clustering activations of the multi-layer network into key attributes; and displaying the key attributes to a user on a display and prompting the user to annotate the key attributes with class label;

generating an attribute database based on user generated annotations of the key attributes;

extracting salient patches from a test image, the test image having at least one object associated with the salient patches;

mapping the salient patches onto a binary attribute vector, the binary attribute vector indicating an existence or absence of key attributes in the test image;

classifying at least one object in the test image by identifying an object class in the attribute database corresponding to the binary attribute vector; and controlling a device based on the classification of the at least one object in the test image.

12. The method as set forth in claim 11, wherein the at least one object is classified based on an optimization routine that minimizes a distance between the binary attribute vector of textual attributes of a class and the binary attribute vector of the key attributes of the test image.

13. The method as set forth in claim 11, wherein controlling the device includes causing the device to maneuver based on the classification of the at least one object in the test image.

14. The method as set forth in claim 11, wherein the attribute database includes a library of object classes and corresponding textual attributes describing each object.

15. The method as set forth in claim 11, wherein the multi-layer network is a neural network and salient patches are extracted based on the neural network's activation for each image pixel or group of pixels in an image.

* * * * *